(12) United States Patent
Connolly et al.

(10) Patent No.: US 12,505,614 B2
(45) Date of Patent: Dec. 23, 2025

(54) EDITING MIXED-REALITY RECORDINGS

(71) Applicant: Apple Inc., Cupertino, CA (US)

(72) Inventors: Matthew S Connolly, San Jose, CA (US); David J Addey, Santa Cruz, CA (US); Daniel Molina Gomes Figueiredo E Silva, San Francisco, CA (US); Michael D Rosen, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 198 days.

(21) Appl. No.: 18/356,658

(22) Filed: Jul. 21, 2023

(65) Prior Publication Data

US 2024/0029381 A1 Jan. 25, 2024

Related U.S. Application Data

(60) Provisional application No. 63/391,101, filed on Jul. 21, 2022.

(51) Int. Cl.
| | |
|---|---|
| *G06T 17/00* | (2006.01) |
| *G06T 19/00* | (2011.01) |
| *G06T 19/20* | (2011.01) |

(52) U.S. Cl.
CPC ............ *G06T 17/00* (2013.01); *G06T 19/006* (2013.01); *G06T 19/20* (2013.01); *G06T 2210/61* (2013.01)

(58) Field of Classification Search
None
See application file for complete search history.

(56) References Cited

U.S. PATENT DOCUMENTS

| | | | |
|---|---|---|---|
| 10,534,525 B1* | 1/2020 | Suchland | H04L 67/1097 |
| 10,796,473 B1* | 10/2020 | Lim | G06T 19/006 |
| 10,825,258 B1* | 11/2020 | Smet | G06T 11/206 |
| 11,030,814 B1* | 6/2021 | Kwiatkowski | G06T 19/006 |
| 11,315,301 B1* | 4/2022 | Lim | G06V 40/161 |
| 12,260,456 B2* | 3/2025 | Simpson | G06F 3/04817 |
| 2010/0241670 A1 | 9/2010 | Justice et al. | |
| 2017/0061693 A1* | 3/2017 | Kohler | G06T 19/006 |
| 2017/0329503 A1* | 11/2017 | Tilton | G06F 3/011 |
| 2018/0121069 A1* | 5/2018 | DiVerdi | G06T 11/60 |
| 2019/0199993 A1* | 6/2019 | Babu J D | G06T 15/08 |
| 2019/0333288 A1* | 10/2019 | Smet | G06T 19/006 |
| 2020/0043237 A1* | 2/2020 | Desai | G06F 3/0346 |
| 2020/0120400 A1* | 4/2020 | Palmer | G06V 40/28 |
| 2020/0382724 A1* | 12/2020 | Pena | G06F 3/04883 |
| 2021/0327145 A1 | 10/2021 | Noorkami et al. | |

(Continued)

FOREIGN PATENT DOCUMENTS

WO 2022/055650 A1 3/2022

*Primary Examiner* — Ryan M Gray
(74) *Attorney, Agent, or Firm* — BakerHostetler

(57) ABSTRACT

Improved techniques for editing and rendering a mixed-reality recording are provided, including receiving such a mixed-reality recording including parameters of the natural and/or synthetic elements, and then responsive to a user selection of a selected element of a plurality of elements in the recording, building an animation track based on the selected element including parameter(s) of the selected element. Responsive to a user modification input, modifying the parameter(s) of the selected element based on the user modification input, and storing a modified recording including the modified parameter(s).

20 Claims, 8 Drawing Sheets

(56) References Cited

U.S. PATENT DOCUMENTS

| | | | |
|---|---|---|---|
| 2022/0207833 A1* | 6/2022 | Smet | G06F 8/33 |
| 2022/0351445 A1* | 11/2022 | Kondoh | G11B 27/031 |
| 2023/0162408 A1* | 5/2023 | Schager | G06T 7/12 |
| | | | 345/581 |
| 2023/0298364 A1 | 9/2023 | Berman et al. | |
| 2024/0029381 A1* | 1/2024 | Connolly | H04N 21/816 |

* cited by examiner

100

500

700

800

900

EDITING MIXED-REALITY RECORDINGS

This application claims the benefit of U.S. Provisional Application No. 63/391,101, filed Jul. 21, 2022, and titled "Scene Tracks For Representing Media Assets," and this provisional application is incorporated herein by reference.

BACKGROUND

The present disclosure is directed to editing of media, and, in particular, modification of recordings of mixed-reality scenes.

A mixed reality scene may include natural elements existing in a real-world scene combined with synthetic elements projected into the real-world scene. A recording of a mixed-reality scene may be used, for example, to document a user's experience in a mixed reality scene, or to provide training for future users of an application of mixed-reality.

DETAILED DESCRIPTION

Figure 1:
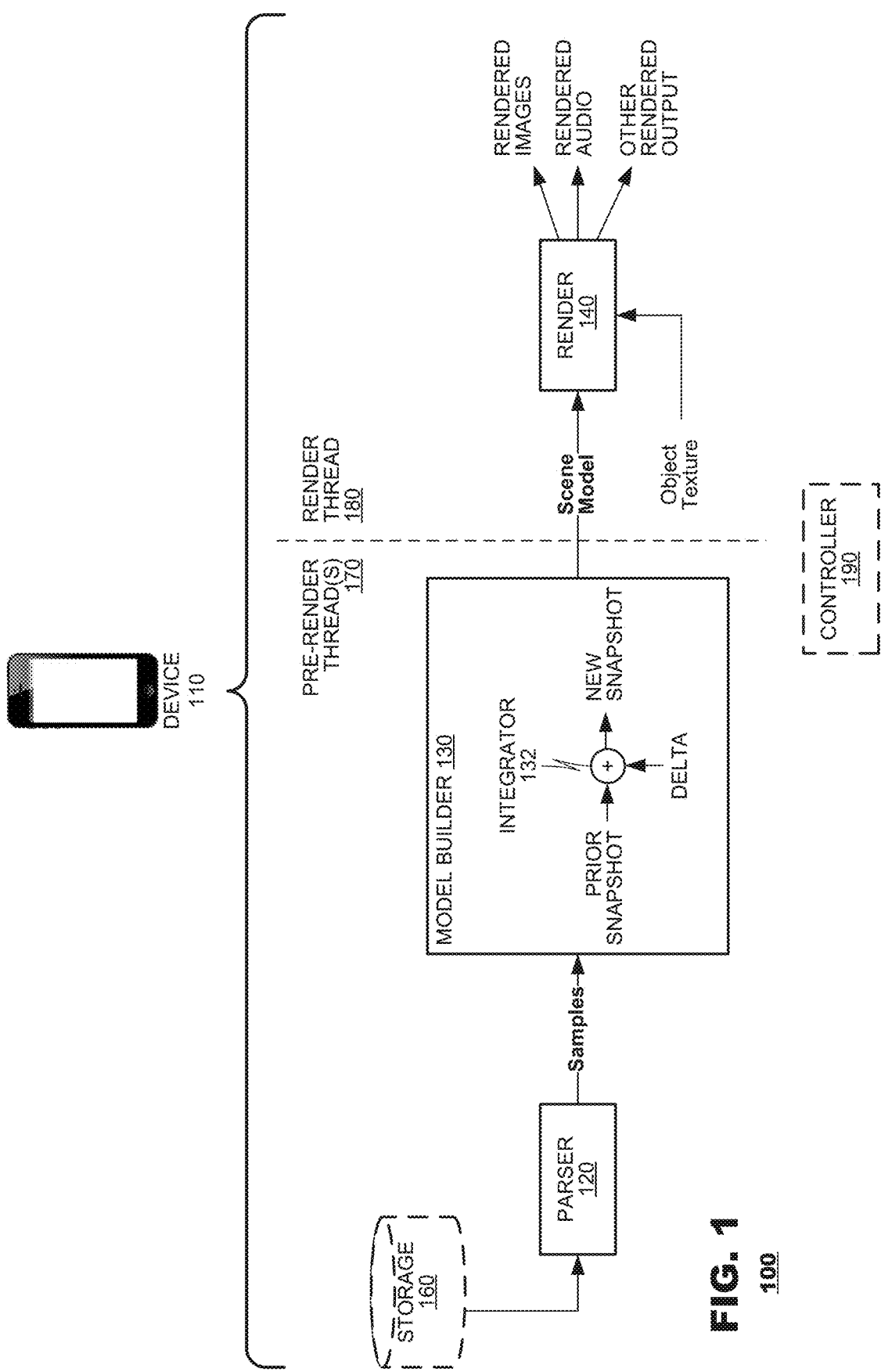
FIG. 1 is a block diagram of a media processing system according to an aspect of the present disclosure.

In a first set of examples of technologies disclosed herein, techniques for editing and rendering a mixed-reality recording are provided. A mixed reality scene may include natural elements existing in a real-world scene combined with synthetic elements projected into the real-world scene. A mixed-reality recording may include a user's experience of a mixed-reality scene, including a sensor recording of natural elements in the real-world scene and synthetic elements projected into the mixed-reality scene.

Techniques for editing a mixed reality scene may include receiving such a mixed-reality recording including parameters of the natural and/or synthetic elements, and then responsive to a user selection of a selected element of a plurality of elements in the recording, building an animation track based on the selected element including parameter(s) of the selected element. Responsive to a user modification input, modifying the parameter(s) of the selected element based on the user modification input, and storing a modified recording including the modified parameter(s).

Elements of a mixed reality scene may be represented in a scene hierarchy. In aspects, the hierarchy may be explicitly stored in an original recording of the mixed reality scene, or in other aspects, a hierarchy may be extracted from an original recording without an explicit hierarchy. The hierarchy may identify subsets of the elements in the scene, and may indicate how the separate elements or subsets of elements are to be composited together when the recorded scene is rendered.

In aspects of some implementations, a modified recording may include a modification of an original animation track as a replacement of, or in addition to, the original animation track. The modifications of the animation may be stored in the modified recording as a freestanding animation with the modification, or as an edit track indicating changes to the separate original animation. In some aspects, a freestanding animation track may be stored in snapshot samples in a media stream recording, while an edit track may be stored in delta samples in a media stream recording.

In a second set of examples of technologies disclosed herein, a media file format for improved seeking is provided. In some cases, different tracks for a media item may contain media samples for different content types, such as audio, images, and/or scene descriptions. For example, a media file may include a first track that represents video content of a scene and a separate track that develops an object model of the same scene. A player device may play content of the scene from either (or both) tracks. A file format may include design features that enable efficient storage and streaming, and may also enable efficient processing of time-based media, includes efficient seeking and rending of the media.

Aspects of the present disclosure provide improved media data formats and improved techniques for processing media data. In an aspect of the disclosure, the improved format may represent a media asset and include a sequence of entries for representing a model of objects in the media asset, where each entry describes the model over an interval of media time. The entries may include model snapshots, each providing a self-contained definition of the model over its respective interval, and model deltas, each providing a definition of the object model over its respective interval expressed differentially with reference to a model defined in a prior entry. The improved data format may include a "convenience" entry having a model delta and model snapshot that both describe a common interval of time.

The media formats presented in the instant disclosure can lead to processing advantages when media entries are processed by a consuming device. Model deltas often incur lower resource consumption by consuming devices process as compared to model snapshots, which can lead to resource conservation when consuming devices process entries of a media item from a large number of samples in succession (e.g., across multiple snapshots). Model snapshots, however, support discontinuous playback flow across a media items, which may be necessary in "trick play" modes that require fast progressions across a media timeline, discontinuous progressions across a media timeline, and the like. Moreover, model snapshots and model deltas can be processed in batch processing, outside of the processing systems that apply rendering data to object models, which as discussed below conserve processing resources even further.

In an aspect, a first model snapshot for a first interval may identify objects in a scene, and a first model delta for a second interval may identify changes to the objects in the scene, new objects added to the scene, and/or removal of objects in the scene. In another aspect, a first model delta for a first interval may be defined with reference to a prior entry of a second model delta for a second interval. In a further aspect, the scene is a three-dimensional (3D) scene, the objects are 3D objects, and the state is a 3D state. In aspects, an interval of media time be identified by a timestamp.

In an aspect of the disclosure, improved processing techniques include seeking within a media stream from a current media time to a desired media time and identifying a first media sample corresponding to the desired media time. When the first media sample contains a model delta at the desired media time and the model delta refers to a second media sample corresponding to a second media time, creating a temporary snapshot at the desired media time by merging the second media sample with the model delta at the desired media time, and rendering the temporary snapshot. When the first media sample contains a snapshot at the desired media time, rendering the snapshot from the first media sample. Efficiencies may be achieved by the merging of the second media sample with a model delta from a different media sample. A rendering of the merged media samples may be more efficient than a rendering processes that must consider both media samples in order to render the desired media time. Furthermore, when merging and rendering are performed in different threads, reliability and efficiency of the rendering thread may be improved. In many cases, a rendering thread operates in real-time or near-real-time, and may have an increased need for reliable or predictable processing latencies as compared to pre-rendering operations, such as model building and merging samples.

In an aspect, the second media sample may include a snapshot at the second media time, and the creating of the temporary snapshot may include merging the snapshot at the second media time with the model delta at the desired media time. In another aspect, the second media sample may include a model delta at the second media time that refers to a third media sample corresponding to a third media time, the creating of the temporary snapshot may include merging the model delta at the second media time with the model delta at the desired media time. In a further aspect, the creation of the temporary snapshot may occur on a computing device within the context of a first computer thread, and the rendering of the snapshots may occur on the computing device within the context of a second computer thread, separate from the first computer thread. In an additional aspect, the media stream may include a sequence of entries for representing a model of objects in a media asset, each entry describing the model over an interval of media time, and the second media sample may be a "convivence" media sample including both a model snapshot at the desired media time providing a self-contained definition of the model over its respective interval including the desired media time, and including a model deltas providing a definition of the model over the respective interval with reference to a model defined in a second media sample for a corresponding second media time.

Techniques described herein may provide a variety of improved efficiencies. For example, in a first aspect, the use of delta samples allows for more efficient encoding of media items as compared to use of snapshots only. In a second aspect, the various uses of snapshots and delta samples described herein provide encoded data access efficiencies, such as by reducing the number of accesses to encoded data or a reduction in the amount of encoded data needed for a seek operation within an encoded media item. In a third aspect, a division between render-time and pre-rendering operations may improve render-time performance, such as by reducing a rendering latency, and furthermore, encoded format may facility such render-time performance improvements.

FIG. 1 is a block diagram of a media processing system 100 according to an aspect of the present disclosure. Media processing system 100 may be implemented, for example, on a computing device such as device 110. Media processing system 100 may include a parser 120, model builder 130 with an integrator 132, and a render component 140.

In operation, a stream of a media item may include a series of entries of the media item, each entry corresponding to a sample of a scene described by the media item over the sample's corresponding range of time. Parser 120 may identify samples of an encoded media item for use by model builder 130. Samples of the media item may include "snapshots" and/or "deltas" of a scene represented in the media item, where a snapshot may provide a self-contained definition of the model over the sample's respective time interval, and a delta may provide a definition of the model over its respective interval expressed differentially with reference to a model defined in a different sample. Thus, interpretation of a delta may be contingent on the other different sample, while interpretation of a snapshot may not be contingent on any other samples. Integrator 132 may combine a delta having a current sample's time range (or a current time range) with a snapshot having a different time range to create a new snapshot for the current time range. An object model of a scene may be provided to render component 140 for each temporal instance of the scene to be rendered. In an aspect, render component 140 may integrate the object model with other content element(s) provided to it and render the resultant scene description on a playback device, for example, rendered video, rendered audio, and/or other rendered media types (such as closed captioning, hepatic feedback, etc.)

In an aspect, media samples, snapshots, and deltas may describe models of objects in a scene to be rendered. For example, a live scene of real objects may have been captured by a camera and mic and may be encoded in the media item as a samples describing a model of the objects in the live scene, a scene of synthetic objects may be model encoded as samples of a model, such as a two-dimensional (2D) or three-dimensional (3D) model, of the synthetic objects, and synthetic and live objects may be combined in a single media item.

In the case of a 2D or 3D model of a scene, elements of the model may include a scene structure, scene assets, and scene anchors. Scene structure may include, for example, a tree of objects or other entities in the scene, and components assigned to those entries. Scene assets may include 2D or 3D geometry, textures, animations, and audio files, which may be associated with objects in the scene.

As explained above, a snapshot may provide a self-contained definition of the model over its respective interval. For example, a snapshot of a 3D scene model may be used to construct the state of all models of all objects in the scene at that moment in time from scratch without reference to other samples in the sequence of entries in the media item, and the constructed state may include scene structure, scene assets, geometry, textures, audio files, etc.

As also explained above, a delta may provide a definition of the object model differentially with reference to a previously defined model. For example, a delta of a 3D scene model may describe changes to the scene structure, scene assets, geometry, textures, audio files, etc. described in a previous media sample. The changes to the model described by a delta may include, for example, addition of object(s), removal of object(s), or changes to object(s). Deltas may also describe addition, removal, or changes to attributes, such as location, size, transparency, associated sound volume, etc., of preexisting objects in the scene. In an aspect, a delta's reference media sample, from which change is differentially described, may occur before or after the delta's time interval.

In an example of delta integration, model builder 130 may construct a model of a scene from a snapshot of the scene corresponding to a first time, and provide a representation of the object model to render component 140 for rendering. Then while render component 140 is rendering the scene at the first time, model builder 130 may integrate the model of the scene at the first time with a delta of the scene at a second time. When the delta includes a new object that did not exist in the scene model at the first time, the new object may be added to the updated scene model. When the delta removes an object from the scene, the object may be deleted from the updated scene model. When the delta includes changes to an attribute of an object (e.g., location or transparency of the object), model builder 130 may alter that object's attribute accordingly in the updated scene model. Render elements from the updated scene model may then be provided to render component 140 in order to render the scene at the second time.

In an aspect, model builder 130 and render component 140 may operate separately. For a first example, model builder 130 and render component 140 may operate in parallel within the context of separate respective process threads on a common processing device, such as one or more optional pre-render thread(s) 170 and one or more optional render thread(s) 180. In another example, model builder 130 and render component 140 may operate in parallel on separate processors, on separate cores of a processor, or on custom circuitry (such as a graphic processing unit (GPU) and audio circuitry).

Optionally, in another aspect, system 100 may include storage 160 and controller 190. Storage 160 may store the media item in an encoded serialized media data format including a series of entries of media samples. Storage 160 may be part of device 110. In another example, storage 160 may be part of a network-connected device separate from system 100, and parser may retrieve portions of the media item from the separate device via a network. In yet another example the media item processed by system 100 may be created in real-time, such as by a live capture device, and the media item may not exist as a complete data file on any storage device. Controller 190 may be a central processing unit (CPU) or other processor, and may control operations of parser 120, model builder 130, and render component 140. In an aspect, an operating system running on controller 190 may manage threads 170 and 180.

Figure 2:
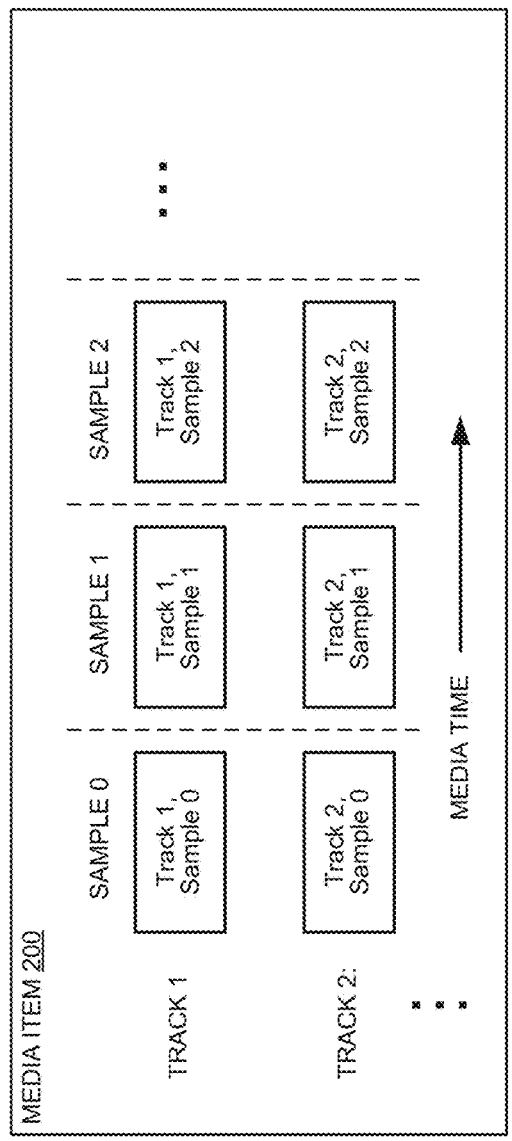
FIG. 2 depicts a media data format with multiple tracks according to an aspect of the present disclosure.

FIG. 2 depicts a media data format with multiple tracks according to an aspect of the present disclosure. Media item 200 may a format of a media item input to parser 120 of FIG. 1 and may be stored on optional storage 160. Media item 200 may include a series of entries of samples 0, 1, 2, . . . , each with a corresponding to media time (for example by including a corresponding media time stamp or indication of a corresponding range of media time for each sample). Samples in media item 200 may be organized in into tracks 1, 2, . . . . For example, as depicted in FIG. 2, media item 200 includes a sample 0 for track 1 and a sample 0 for track 2. Different tracks may correspond, for example, to different media types (e.g., audio, video, or a 2D or 3D synthetic media type), and/or different of versions the same media type (e.g., different language versions of an audio track). Media item 200 may include synchronization information such as timestamps for rendering multiple tracks in sync (e.g., rendering samples from multiple tracks that corresponding to the same media time). In an aspect, the time interval described by sample 0 may be identified by a timestamp of 0, and sample 1 may be identified by a timestamp of 1, etc.

Figure 3:
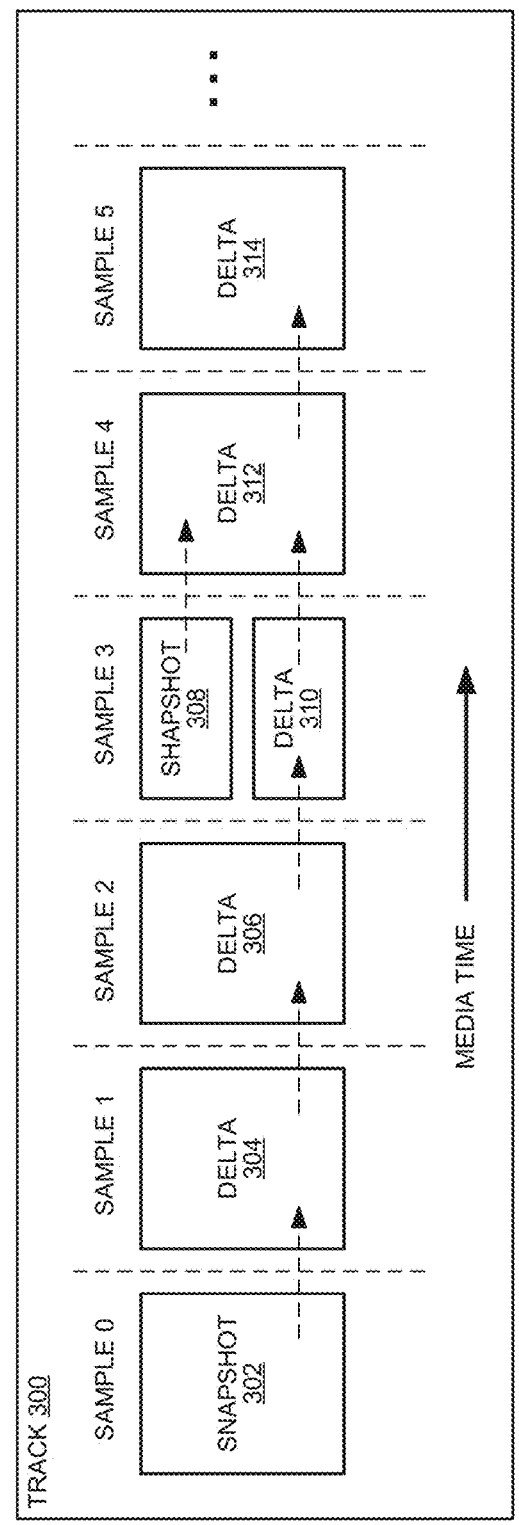
FIG. 3 depicts a format for a track in a media file according to an aspect of the present disclosure.

FIG. 3 depicts a format for a track 300 in a media file according to an aspect of the present disclosure. Track 300 may be a track for a scene in media item 200 of FIG. 2. Track 300 includes a series of media sample entries, each of which includes a snapshot, or a delta, or both. For example, sample 0 includes snapshot 302 corresponding to time 0, sample 2 includes a delta 306 corresponding to time 2, and sample 3 includes both a snapshot 308 and delta 310, and both snapshot 308 and delta 310 correspond to the same time 3. As explained above, snapshots, such as snapshot 302 and snapshot 308, describe a scene without respect or reference to other samples, while deltas, such as delta 306 and delta 310, may only describe a model by way of reference to another sample. In FIG. 3, delta's reference to another sample is depicted with a dashed arrow. For example, delta 304 at time 1 may describe a scene with respect to snapshot 302 at time 0, and delta 314 at time 5 describes a scene with respect to delta 312 at time 4.

Sample 3 in FIG. 3 includes snapshot 308 and delta 310, both of which describe a scene at time 3. This combination of a snapshot and delta corresponding to the same media time is called a "convenience" sample herein. The convenience sample 3 provides a rendering system with options for reconstructing the scene at times 3 and 4. Options for time 3 are considered first. Snapshot 308 describes the scene independently, and hence a media processing system, such as system 100 of FIG. 1, may reconstruct the scene of track 300 based on snapshot 208 without reference to any other samples. Alternately, delta 310 describes the scene at time 3 with respect to sample 2, so a rendering system that already has developed a state of the scene at time 2 may reconstruct the scene at time 3 by integrating delta 310 to the scene state at time 2. In an aspect, a delta sample may be more compact than a snapshot sample. In another aspect, processing requirements for constructing a scene by integrating a delta with a prior know scene may be lower than constructing a scene from scratch with a snapshot.

Convenience sample 3 also allows options for rendering time 4. Sample 4 includes delta 312 referring to the scene at time 3, and the scene at time 3 is described separately in snapshot 308 and delta 310. This allows a rendering system to integrate delta 310 in a state of the scene at time 3 created from snapshot 308 or from delta 310.

When a rendering system renders the samples of track 300 sequentially from sample 0 to sample 5, the rendering system may start by constructing the scene at time 0 with snapshot 302, and then update the scene for times 1, 2, 3, 4, and 5 by sequentially integrating deltas 304, 306, 310, 312, and 314. However, when a rendering system starts rendering at sample 3 or later, for example following a seek within track 300 to media time 4, then the rendering system may start by constructing the scene from snapshot 208 in sample 3 instead of starting with snapshot 302 in sample 0. By starting with the snapshot 308 convenience sample 3, a rendering system may avoid the complexity of integrating deltas from samples 1, 2, and 3.

Figure 4:
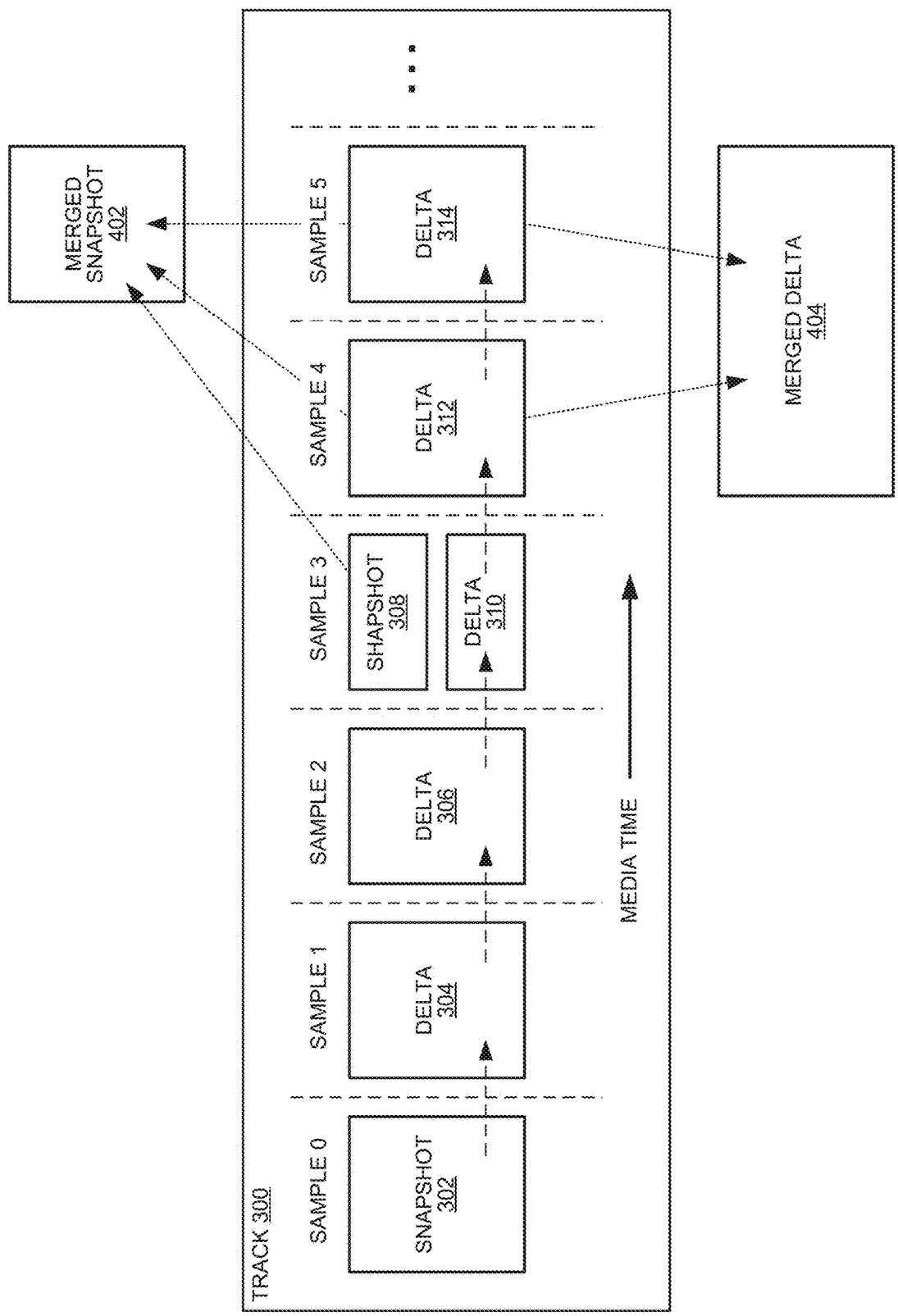
FIG. 4 depicts example merged media samples according to an aspect of the present disclosure.

FIG. 4 depicts example merged media samples according to an aspect of the present disclosure Merged media samples 402 and 404 may be created from track 300 of FIG. 3. In a first example of a merged media sample, a merged snapshot 402 may be created for media time 5 by integrating snapshot 308 with deltas 312 and 314. Then the scene of track 300 can be rendered at time 5 from merged snapshot 402 without further reference to any other samples. In a second example, merged delta 404 describing media time 5 may be created by combining delta 312 and delta 314. Then the scene can be rendered at time 5 with reference to the scene at time 3 as described by either delta 310 or snapshot 308. Construction of merged samples after a seek may enable rendering efficiency, for example when rendering is performed separately from the merging (such as in parallel in separate threads). For example, following a seek to sample 5, construction of a merged snapshot 492 or a merged delta 404 in a separate pre-render thread context may enable lower latencies and/or higher reliability in rendering the scene at time 5.

Media samples may be merged by combining changes described in one or more model deltas. If an object is newly added in a first example delta, the new object may be combined with a prior description of the model. When the first example data is merged with a prior snapshot, a new snapshot may be created that includes the prior snapshot along with the additional new object added by the first example delta. When the first example delta is merged with another delta, a new delta may be created that includes the added new object along with the changes from the merged delta. In a second example delta, a prior object may be deleted. When the second example delta is merged with a prior description of the model, the prior object may simply be removed from the prior description. A third example delta may include a change to an existing object, such as a change to an attribute of the object. When the third example delta is merged with a prior description of the model, the result may be a snapshot or delta indicating the changed attribute of the object. In an aspect, a delta may include multiple changes. For example, a delta my include an addition of a new first object, a removal of a pre-existing second object, as well as a change in an attribute of a pre-existing third object.

In an aspect, media samples may be iteratively merged. For example, a snapshot and a delta (such as snapshot 308 and delta 312) may be merged into a new temporary snapshot, which can then be merged with another delta (such delta 314) to produce a final merged snapshot (such as merged snapshot 402). Similarly, a sequence of deltas may be iteratively merged to produce a new delta.

Figure 5:
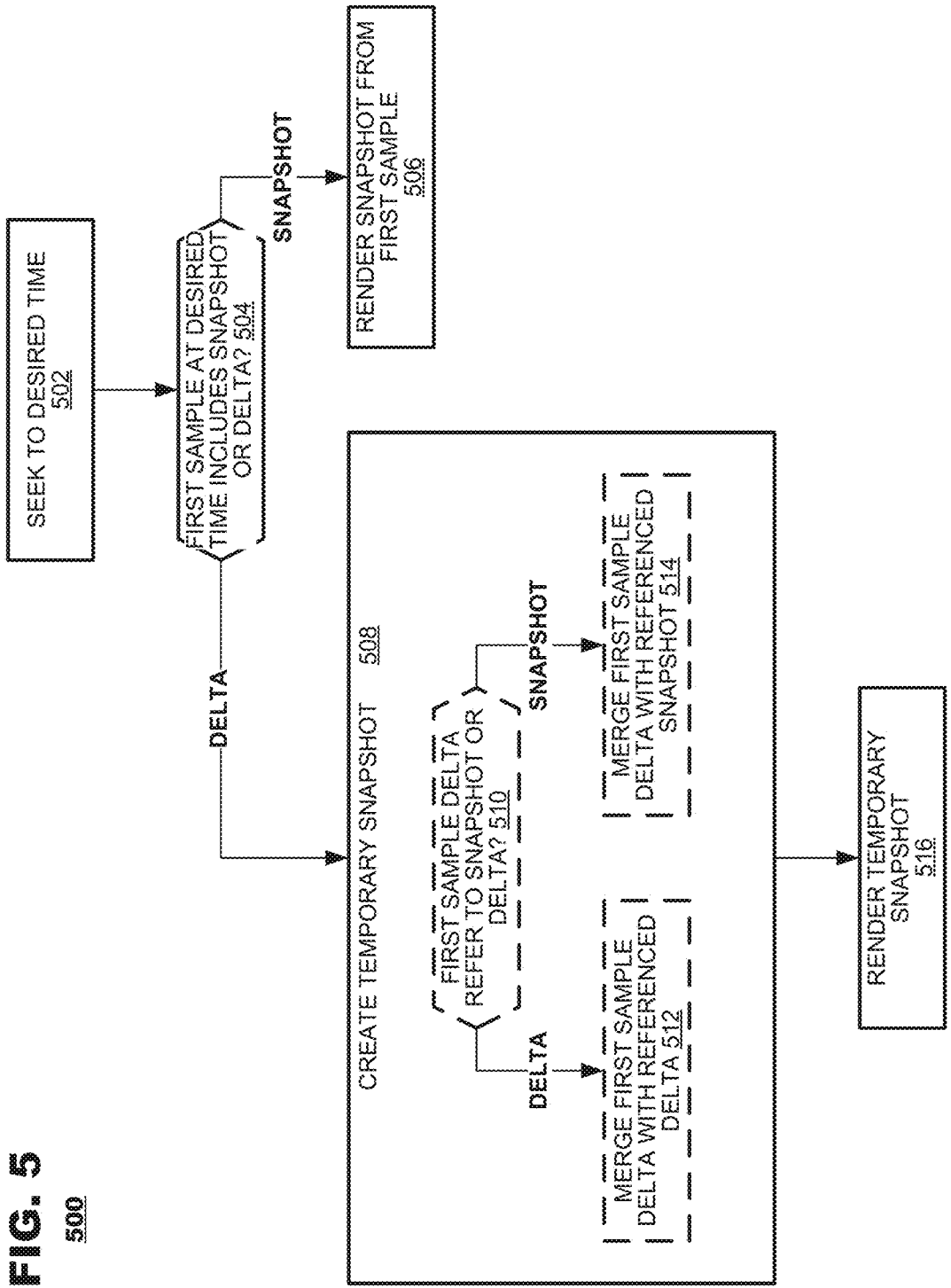
FIG. 5 illustrates a method including creating a temporary snapshot according to an aspect of the present disclosure.

FIG. 5 illustrates a method 500 including creating a temporary snapshot according to an aspect of the present disclosure. Method 500 includes seeking a media item to a desired media time (box 502) to identify a first media sample at the desired media time. When the identified first media sample includes a snapshot (box 504), the snapshot of the first media sample may be rendered (box 506). When the identified media sample includes a delta (box 504), then a temporary snapshot is created (box 508), and the temporary snapshot may be rendered at the desired media time (box 516).

Using FIG. 4 as an example of method 500, the track 300 may be seeked to sample 5 at desired media time 5 (box 502), and because sample 5 includes delta 314, a merged sample, a temporary snapshot such as merged snapshot 402 is created (box 508) and rendered (box 516).

Method 500 also includes optional operations 510, 512 and 514. When the delta in the first media sample delta refers to another delta at a different media time (box 510), the referenced delta is integrated with the first media sample's delta (box 512) to create the temporary snapshot. When the delta in the first media sample delta refers to a snapshot at a different media time (box 510), the referenced snapshot is integrated with the first media sample's delta (box 514) to create the temporary snapshot.

Figure 6:
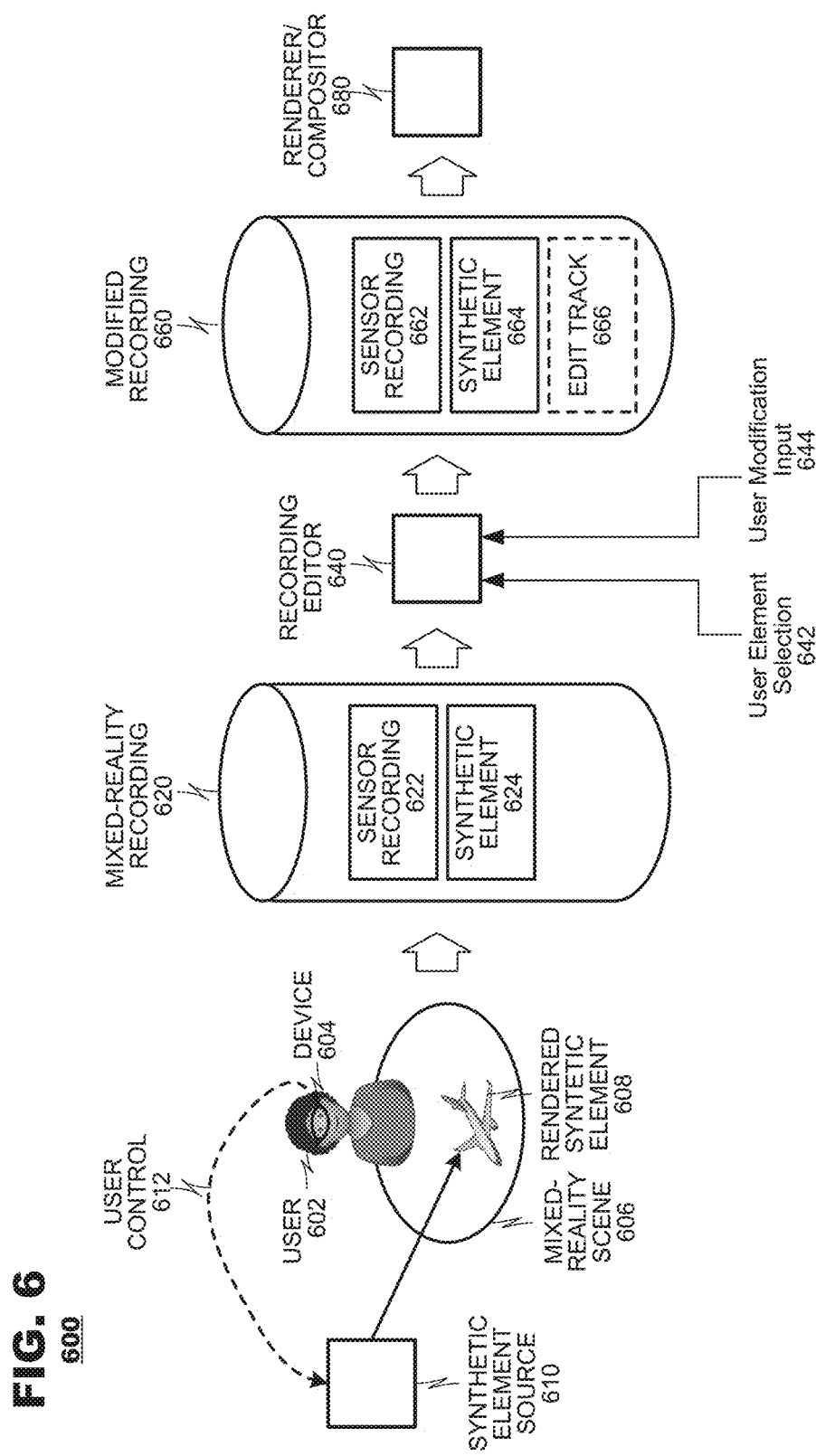
FIG. 6 is an example scenario of mixed-reality recording and editing according to an aspect of the present disclosure.

FIG. 6 is an example scenario 600 of mixed-reality recording and editing according to an aspect of the present disclosure. In the scenario 600, a user 602 is experiencing or otherwise participating in mixed-reality scene 606, which is generated by a device 604. The mixed-reality scene 606 may include a rendered synthetic element 608, shown in the example of FIG. 6 as a toy plane, which may be generated by a synthetic element source 610 that executes on the device 604. The scenario 600 may generates a mixed-reality recording 620 of the mixed realty scene 606, which may include a sensor recorded content 622 and synthetic element content 624. It may be desired to edit content of the mixed-reality recording 620 by an editor.

A recording editor 640 may receive the mixed reality recording 620 and produce a modified recording 660 therefrom, which may include sensor recorded content 662 and synthetic element content 664. It may occur that the recording editor 640 alters the sensor recording 662 as compared to the sensor recording 622 that is input to the editor 640 or that it alters the synthetic element 664 as compared to the synthetic element 624 that is input to the editor 640 in which case, the sensor recording 662 and/or the synthetic element 664 will have changes written directly into those element. In other aspects, the modified recording 660 may include an edit track indicating changes other elements in the modified recording 660, in which case the sensor recording 662 and/or the synthetic element 664 will be copies of the sensor recording 622 and/or the synthetic element 624 that are input to the editor 640. A renderer or compositor 680 may consume modified recording 660 and render the modified recording by compositing elements of the modified recording 660. In an aspect, renderer/compositor 680 may be implemented by device 110 (FIG. 1), including integrating edit track 666 with other elements in modified recording 660.

In addition to synthetic element 608, the mixed reality scene 606 may represent real-world elements (not depicted) such as physical objects and/or sounds in a proximate area around user 602. The rendered synthetic element 608 may be projected into an experience for user 602 to create an augmented reality experience mixing real-world elements with synthetic elements. A recording 620 of the augmented reality experience, therefore, may include both the real-world elements represented by the sensor recording 622 and the synthetic elements 624. These elements may contain metadata (not shown) that models real world elements with which synthetic elements interact in the augmented reality experience.

As shown, the augmented reality experience may be altered or controlled by user input. For example, the scenario 600 may accept user control 612 supplied from user 602 via device 604 for controlling synthetic element 608. The recording editor 640 may also receive user input to control editing, such as user element selection 642 and user modification input 644. The input to the recording editor 640 may but need not be supplied by the same user whose actions are captured in the augmented reality experience. In operation, the recording editor 640 may select one or more elements from mixed-reality recording 620 based on user element selection 642, and recording editor 640 may modify the selected element based on user modification input 644.

The mixed reality scene 606 may be recorded, for example by device 604, to create a mixed reality recording 620, including recording real-world elements by sensor in device 604 as sensor recording 622 along with synthetic elements 624 of the mixed reality scene 606. In an aspect, mixed-reality recoding 620 may be a media stream containing a one or more first tracks of media samples for sensor recording 622 and one or more second tracks of media samples for synthetic element 624.

In application, an augmented reality experience may be provided by a variety of computer-implemented devices. For example, the device 604 may be provided as an augmented reality headset, a smartphone, a tablet computer, a gaming system, or a combination of computer devices.

Figure 7:
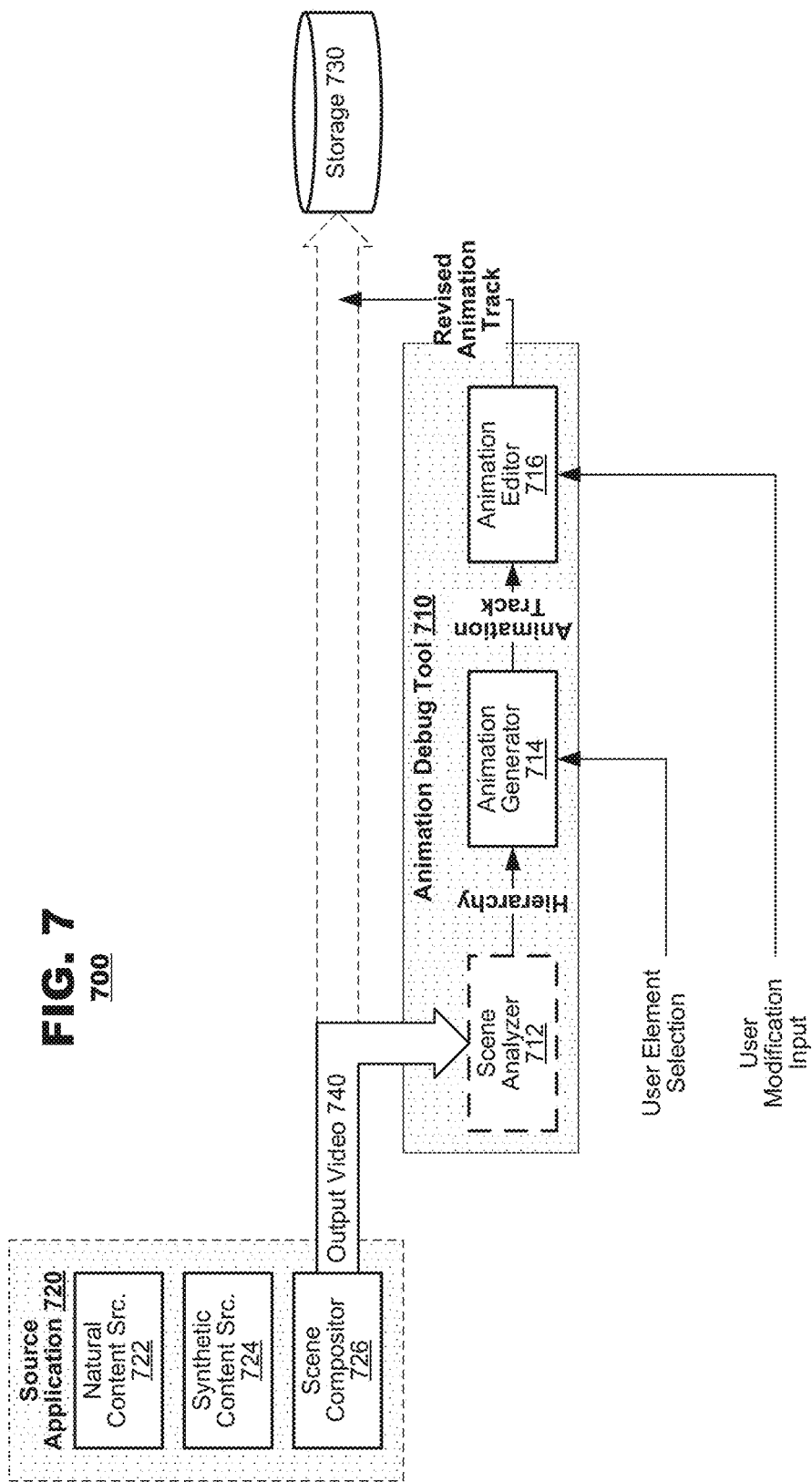
FIG. 7 is a block diagram of a media processing system according to an aspect of the present disclosure.

FIG. 7 is a block diagram of a media processing system 700 according to an aspect of the present disclosure. The system 700 may include a debug tool 710 that edits video 740 output from a source application 720. The video 740 may include both natural content and synthetic content. The debug tool 710 may include a scene analyzer 712, an animation generator 714, and an animation editor 716. An output of the debug tool 710 may be placed in storage 730 as discussed hereinbelow.

The scene analyzer 712 may generate a scene hierarchy for the video 740 input to the debug tool 710. The scene hierarchy may represent content elements represented in the video 740, including, for example, their spatial locations within the scene, and properties of the content elements. The scene hierarchy may represent both natural and synthetic content elements within the scene. In many causes, video output from a source application 720 may already represent content elements hierarchically, in which case, the scene analyzer 712 may adopt hierarchy content provided in the video 740. In other cases where a video 740 does not possess a hierarchy already or the hierarchy is incomplete, the scene analyzer 712 may create a hierarchy from analysis of scene content. The scene analyzer 712 may add content to a hierarchy provided in video 740. For example, content elements often are represented in hierarchies as objects and location(s) of object elements within a scene; a scene analyzer 712 may supplement hierarchy content by adding other object parameters (such as object velocity or other properties) that are not represented in a hierarchy when input with video 740 to the debug tool 710. In some cases, video 740 input to the debug tool 710 may contain a full hierarchy on which an animation generator 714 may operate; in such cases, the scene analyzer 712 may be omitted.

The animation generator 714 may select an element from a hierarchy for editing in response to user input. Responsive to the user selection, the animation generator 714 may generate an animation track that represents the selected element. The animation track may be constructed from a portion of a scene hierarchy that corresponds to the content element selected by a user.

The animation editor 716 may alter properties of the animation track in response to user input. The animation editor 716 may alter object location(s), sizes, velocities, or other object parameters as may be desired by a user. The animation editor 716 may operate recursively by altering object properties, displaying a content element representing the object's behavior based on the new properties, then accepting new user input to alter object properties further. It is expected that, ultimately, a set of object properties will be developed to the user's liking, and the revised animation track may be stored for later use. The animation track may be merged into the video data 740 by overwriting a portion of the video's hierarchy data that corresponds to the altered animation. In another embodiment, the revised animation track may be stored as a new track with the output video 740.

In some implementations, an optional source application 720 may produce an output video 740 that may include natural and synthetic content. For example, source application 720 may include a source of natural content 722, such as video camera, microphone, or other sensor for capturing real-world elements of a mixed-reality scene such as mixed-reality scene 606 (FIG. 6). Source application 720 may also include a source of synthetic content 724, such as an augmented reality user interface for device 604 or synthetic element source 610 (FIG. 6). In one example, the source of synthetic content 724 may be projected by scene compositor 726 into a real-world scene to construct an augmented-reality experience for a user, and the augmented-reality experience may further be recorded by scene compositor 726 and provided as a mixed-reality recording in video 720. In one aspect, a mixed-reality recording including the revised animation track may be stored in storage 730 and may later be rendered, such as by device 110 (FIG. 1), the rendering including integrating the revised animation track with other elements of video 740.

For example, output video 720 may include a sequencing of timed images of a scene, and scene analyzer 712 may analyze the images to identify objected depicted in the images, identify a spatial location of the identified objects in the images, and identify a Z-ordering of the objects, where a Z-ordering indicate an ordering of objects by distance to a camera that captured the images. The identified objects and associated identified information may be provided as hierarchy data to Animation generator 714, which may then generate an animation track based for the objects by a user element selection. Animation editor may then provide a revised animation track that alters the user element selection based on a user input modification, such as to change a coloring velocity of movement of the selected element.

Figure 8:
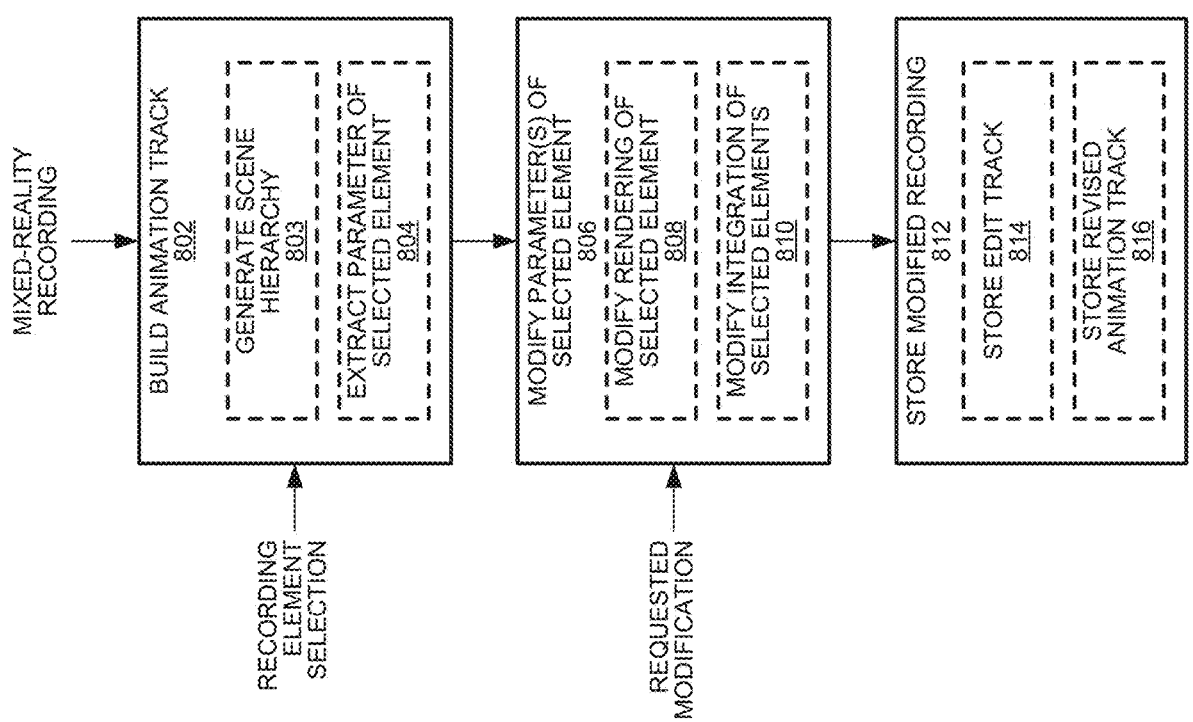
FIG. 8 illustrates a method of mixed reality editing according to an aspect of the present disclosure.

FIG. 8 illustrates a method 800 of mixed reality editing according to an aspect of the present disclosure Method 800 may be performed, for example, at recording editor 640 (FIG. 6) or animation debug tool 710 (FIG. 7). Method 800 includes building an animation track (802) from a mixed-reality recording. The mixed reality recording may be received, for example, from a mixed-reality source application, such as source application 720, that may be running on a device such as device 604 at the creation of the mixed-reality recording of mixed-reality scene 606. Responsive to a selection of a one or more elements in the mixed-reality recording, method 800 may build an animation track based on the selected recording element (802). Responsive to a requested modification, method 800 may include modifying one or more parameters associated with the one or more selected elements in the recording (806), and a modified recording including the modified parameter(s) may be stored (812), for example, for later rendering or further editing.

In aspects of some implementations, the recording element selection and/or the requested modification may be provided by a user before, during, or after creation of the mixed reality recording, and may be provided by an editing user different from a user (such as user 604) that may be present at the scene of the mixed reality recording.

Some optional aspects of building an animation track (802) may include generating a scene hierarchy (803) of a scene represented in the received mixed-reality recording. For example, a scene hierarchy may be generated by scene analyzer 712 (FIG. 7). One or more parameters of a selected element(s) of the recording may be extracted (804), such as by scene analyzer 712 or animation generator 714 (FIG. 7).

In an aspect, the recording element selection may correspond to only a subset of a scene hierarchy for a scene in the recording, for example corresponding to a subset of scene elements. The animation track may be built (802) based on the subset of the scene hierarchy corresponding to elements in the recording indicated by the recording element selection, and the animation track may include the extracted parameters of recording elements indicated by the recording element selection.

Some optional aspects of modifying parameters of the selected element(s) (806) may include modifying how the selected recording element(s) are rendered in the animation track (808), and/or modifying a manner of integrating the selected element(s) into the rest of the mixed-reality scene (810). Changing how an element is rendered may, for example, change a coloring, shape, or motion of an object in the scene corresponding to the selected element. Changing a manner of integrating selected element(s) may, for example, change a transparency or location of an object or a shadow cast by the object on other objects in the scene.

Storing a modified recording (812) may also include optional aspects, such as storing an edit track (814) indicating a change to another portion of the mixed-reality recording, and/or storing a revised animation track. For example, an edit track may be stored in delta samples, such as delta sample 310 (FIG. 3) while the portion of the recording changed by the edit track may be stored in snapshot samples, such as snapshot sample 308 (FIG. 3). In an alternate aspect, a revised animation track may be stored in snapshot samples where the revised animation track may be rendered without reference to a separate edit track.

Figure 9:
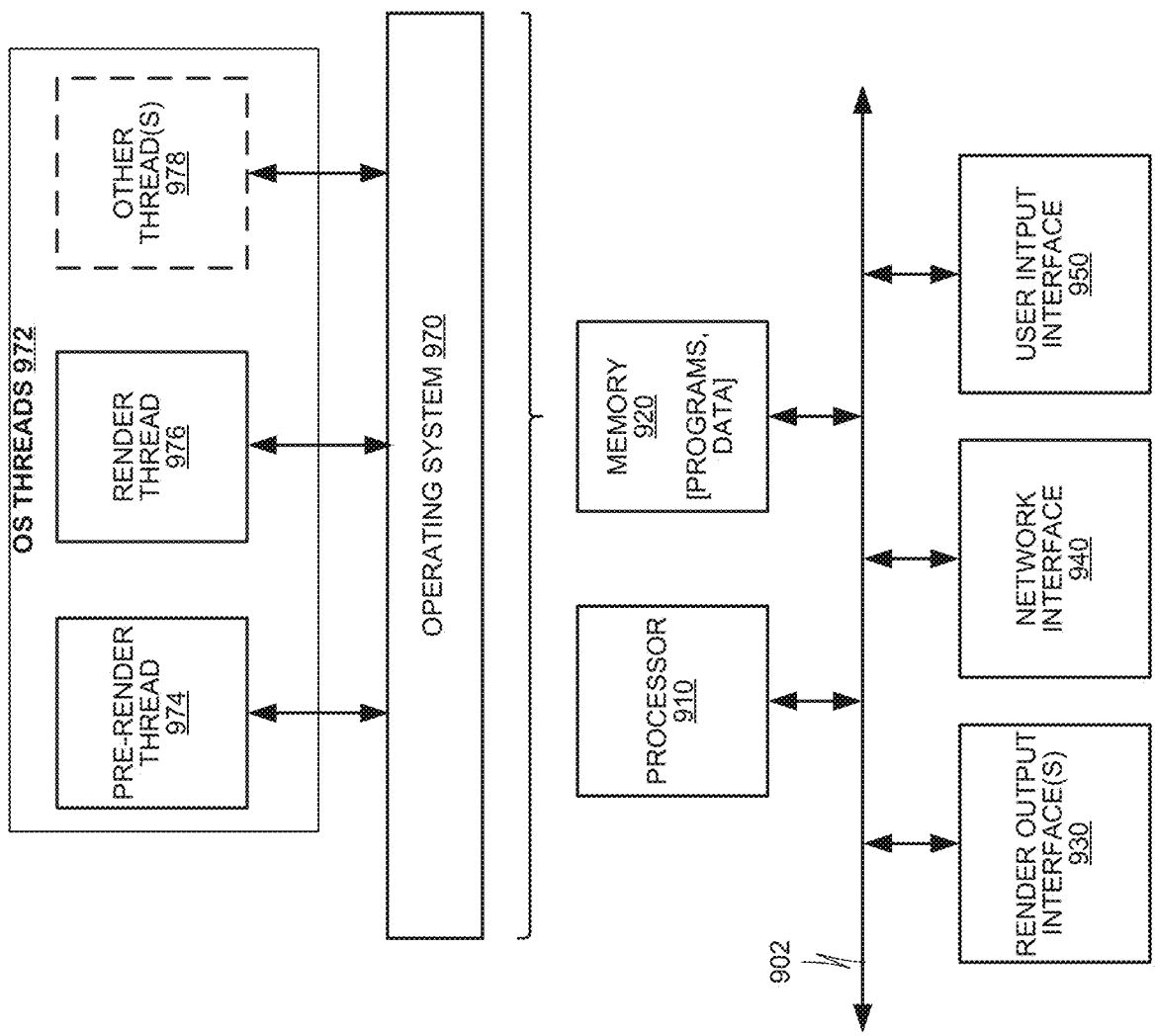
FIG. 9 illustrates a computing device according to an aspect of the present disclosure.

FIG. 9 illustrates a computing device 900 according to an aspect of the present disclosure. The computing device 900 can be, and/or can be a part of, any computing device or server for generating the features and processes described above, including but not limited to a laptop computer, a smartphone, a tablet device, a wearable device such as a headset, goggles, or glasses, and the like. For example, computing device 900 may be used to implement device 110 (FIG. 1), method 500 (FIG. 5), device 604, recording editor 640, and/or renderer/compositor 680 (FIG. 6), and method 800 (FIG. 8). The computing device 900 may include various types of computer readable media and interfaces for various other types of computer readable media. The computing device 900 includes memory 920, a user input device interface 950, a rendered output device interface 930, a bus 902, one or more processing unit(s) 910, a network interface 940, and/or subsets and variations thereof.

The bus 902 collectively represents all system, peripheral, and chipset buses that communicatively connect the numerous internal devices of the computing device 900. In one or more implementations, bus 902 communicatively connects the one or more processing unit(s) 901 with memory 920. The one or more processing unit(s) 910 may retrieves instructions to execute and data to process from memory 920 in order to execute the processes of the subject disclosure. The one or more processing unit(s) 910 may be a single processor or a multi-core processor in different implementations.

Memory 920 may include one or more permanent storage and/or temporary storage device(s), such as a tangible computer readable medium, read-only-memory (ROM), read-and-write memory such as random-access-memory (RAM), hard disks and other non-volatile memory devices, optical discs, flash memory, etc. Memory 920 may contain instructions and/or data for several programs, such as operating system 970, and the processes running within a context of pre-render thread 974, render thread 976, and other separate threads contexts.

Bus 902 also connects to the input and output device interfaces 930, 950. The input device interface 950 may enable a user to communicate information and select commands to the computing device 900. Input devices used with the input device interface 950 may include, for example, alphanumeric keyboards and pointing devices (also called "cursor control devices"). The output device interface 930 may enable, for example, rendering of images and sounds generated by computing device 400. Output devices that may be used with the output device interface 408 may include, for example, printers and display devices, such as a liquid crystal display (LCD), a light emitting diode (LED) display, an organic light emitting diode (OLED) display, a flexible display, a flat panel display, a solid-state display, a projector, a sound speaker, tactile or hepatic output, or any other device for outputting information. In an aspect, some devices such as a touchscreen, may provide both user input and user output to device 900.

Finally, as shown in FIG. 9, the bus 902 also couples the computing device 900 to one or more networks and/or to one or more network nodes through the one or more network interface(s) 940. In this manner, the computing device 900 can be a part of a network of computers (such as a LAN, a wide area network ("WAN"), or an Intranet, or a network of networks, such as the Internet. Any or all components of the computing device 900 can be used in conjunction with the subject disclosure.

The foregoing discussion has described operation of the aspects of the present disclosure in the context of a media processing system, such as system 100 depicted FIG. 1. Commonly, these components are provided as electronic devices. Video processing systems and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in non-transitory physical storage media such as electronic, magnetic, and/or optically-based storage devices, where they are read by a processor and executed. Media processing systems commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Several aspects of implementations of the invention are specifically illustrated and/or described herein. However, it will be appreciated that modifications and variations of the invention are covered by the above teachings and within the purview of the appended claims without departing from the spirit and intended scope of the invention.

We claim:

1. A method for editing, comprising:
    receiving an original recording of a mixed-reality scene, the original recording having content derived from a sensor recording and synthetic content of the mixed-reality scene, and the original recording representing the content as a plurality of elements and parameters of the elements;
    in an editing mode:
        responsive to a user selection of a selected element of the plurality of elements, building an animation track based on the selected element including parameter(s) of the selected element, wherein the animation track provides an editing workspace representing the selected element over the mixed-reality scene represented in the original recording;
responsive to a user modification input, modifying the parameter(s) of the selected element in the animation track based on the user modification input; and
upon conclusion of the editing mode, storing a modified recording including the modified parameter(s) of the animation track.

2. The method for editing of claim 1, wherein the original recording includes a scene hierarchy of the elements in scene, the selected element indicates a subset of the scene hierarchy, and the building of the animation track is based on the subset of the scene hierarchy.

3. The method for editing of claim 2, wherein:
the selected element includes synthetic content described by the subset of the scene hierarchy; and
the parameter(s) of the selected element control rendering of the selected element.

4. The method for editing of claim 2, wherein
the selected element includes synthetic content described by the subset of the scene hierarchy; and
the parameter(s) of the selected element control a composition of the mixed-reality scene including a manner of integrating the synthetic content of the subset of the scene hierarchy with the sensor recording.

5. The method for editing of claim 1, wherein the modified recording includes a first track for the sensor recording and a second track for the synthetic content.

6. The method for editing of claim 5, further comprising:
modifying the animation track based on the modified parameter(s);
wherein the second track for the synthetic content includes the modified animation track.

7. The method for editing of claim 5, wherein the second track for the synthetic content includes the animation track and the modified recording further includes a third track indicating the modified parameter(s).

8. The method for editing of claim 1, wherein the modified recording is a media stream including the animation track contained in at least one snapshot sample and including the modified parameters in at least one delta sample indicating a modification of the at least one snapshot sample.

9. The method for editing of claim 1, wherein the parameter(s) of the selected element is extracted from the selected element by identifying an internal control parameter of a model for generating the selected element, and determining a value of the internal control parameter over time during the recording of the mixed-reality scene.

10. The method for editing of claim 1, wherein the sensor recording includes timed user input from a user interface of a device generating at least a portion of the mixed reality scene.

11. The method for editing of claim 1, wherein the sensor recording includes at least one of: an audio recording of the mixed-reality scene from a microphone sensor, and a video recording of the mixed reality scene from a camera sensor.

12. A computer readable storage device including instructions for editing that, when executed by a processor, the processor causes:
receiving an original recording of a mixed-reality scene having content derived from a sensor recording and synthetic content of the mixed-reality scene, the original recording representing the content as a plurality of elements and parameters of the elements;
in an editing mode:
responsive to a user selection of a selected element of the plurality of elements, building an animation track based on the selected element including parameter(s) of the selected element, wherein the animation track provides an editing workspace representing the selected element over the mixed-reality scene represented in the original recording;
responsive to a user modification input, modifying the parameter(s) of the selected element based in the animation track on the user modification input; and
upon conclusion of the editing mode, storing a modified recording including the modified parameter(s) of the animation track.

13. The device of claim 12, wherein the original recording includes a scene hierarchy of the elements in scene, the selected element indicates a subset of the scene hierarchy, and the building of the animation track is based on the subset of the scene hierarchy.

14. The device of claim 13, wherein:
the selected element includes synthetic content described by the subset of the scene hierarchy; and
the parameter(s) of the selected element control rendering of the selected element.

15. The device of claim 13, wherein
the selected element includes synthetic content described by the subset of the scene hierarchy; and
the parameter(s) of the selected element control a composition of the mixed-reality scene including a manner of integrating the synthetic content of the subset of the scene hierarchy with the sensor recording.

16. The device of claim 12, wherein the modified recording includes a first track for the sensor recording and a second track for the synthetic content.

17. An editing device, comprising:
a processor, and
a computer readable storage including instructions that, when executed by the processor, the device causes:
receiving an original recording of a mixed-reality scene having content derived from a sensor recording and synthetic content of the mixed-reality scene, the original recording representing the content as a plurality of elements and parameters of the elements;
in an editing mode:
responsive to a user selection of a selected element of the plurality of elements, building an animation track based on the selected element including parameter(s) of the selected element, wherein the animation track provides an editing workspace representing the selected element over the mixed-reality scene represented in the original recording;
responsive to a user modification input, modifying the parameter(s) of the selected element in the animation track based on the user modification input; and
upon conclusion of the editing mode, storing a modified recording including the modified parameter(s) of the animation track.

18. The editing device of claim 17, wherein the original recording includes a scene hierarchy of the elements in scene, the selected element indicates a subset of the scene hierarchy, and the building of the animation track is based on the subset of the scene hierarchy.

19. The editing device of claim 18, wherein:
the selected element includes synthetic content described by the subset of the scene hierarchy; and
the parameter(s) of the selected element control rendering of the selected element.

20. The editing device of claim 18, wherein
the selected element includes synthetic content described by the subset of the scene hierarchy; and the parameter(s) of the selected element control a composition of the mixed-reality scene including a manner of integrating the synthetic content of the subset of the scene hierarchy with the sensor recording.

* * * * *